(12) United States Patent
Garcia-Ortiz et al.

(10) Patent No.: US 7,688,605 B2
(45) Date of Patent: Mar. 30, 2010

(54) SYSTEMS AND METHODS FOR REDUCING THE MAGNITUDE OF HARMONICS PRODUCED BY A POWER INVERTER

(75) Inventors: Asbrubal Garcia-Ortiz, Chesterfield, MO (US); John Wootton, St. Louis, MO (US); Michael Duello, St. Louis, MO (US)

(73) Assignee: DRS Sustainment Systems, Inc., St. Louis, MO (US)

( * ) Notice: Subject to any disclaimer, the term of this patent is extended or adjusted under 35 U.S.C. 154(b) by 163 days.

(21) Appl. No.: 11/190,743

(22) Filed: Jul. 27, 2005

(65) Prior Publication Data

US 2007/0025129 A1    Feb. 1, 2007

(51) Int. Cl.
*H02M 7/483* (2007.01)
(52) U.S. Cl. ......................... 363/41; 332/110
(58) Field of Classification Search ............... 363/41, 363/40, 42; 332/123, 109–110, 112–113
See application file for complete search history.

(56) References Cited

U.S. PATENT DOCUMENTS 5,739,658 A * 4/1998 Thompson .................. 318/599
6,107,776 A * 8/2000 Nakazawa .................. 318/811
6,466,465 B1   10/2002 Marwall
6,674,789 B1 * 1/2004 Fardoun et al. ............. 375/132

OTHER PUBLICATIONS

Nova Electric, DC-AC Inverter FAQ, Nova Electric Application Notes, 1998 [on-line], retrieved Dec. 17, 2009 at URL: http://www.novaelectric.com/inverters_faq/.php, 3 pages.*
Bausch, H., and Hoffmann, H., "A Starter/Alternator System with Permanent Magnet Machine and AC Power Supply Based on a Space Vector Controlled Three- and Single-Phase Converter for Mobile Applications", Universitat der Bundeswehr Munchen;.
Chapman, S., "Pulse-Width Modulation Inverters", in "Electric Machinery Fundamental," (McGraw Hill 2000, 3rd Ed.), pp. 189-195.
U.S. Department of Energy, Energy Efficiency and Renewable Energy, Oct. 2003 [online], [retrieved Apr. 4, 2005] <URL: http://www.eere.energy.gov/consumerinfor/factsheets/bb8.html>.
Mihalache, L., "DSP Control of 400 Hz Inverters for Aircrfaft Applications", Power Conversion Technologies, Inc.
Tolbert, L. and Habetler, T., "Novel Multilevel Inverter Carrier-Based PWM Methods", IEEE IAS 1998 Annual Meeting, St. Louis, Missouri, Oct. 10-15, 1998, pp. 1424-1431.

(Continued)

*Primary Examiner*—Harry Behm
(74) *Attorney, Agent, or Firm*—Sonnenschein Nath & Rosenthal LLP (57) ABSTRACT

Systems and methods are provided for operating a pulse width modulation (PWM) circuit in a direct current (DC) to alternating current (AC) power inverter to reduce the magnitude of harmonics. The PWM circuit operates using a reference signal having an irregular period. In one implementation the irregular periodicity includes a sequence of periods uniformly distributed about a target period.

12 Claims, 5 Drawing Sheets

OTHER PUBLICATIONS

"Sinusoidal PWM Operation of an AC Induction Motor Controller", AC Motor Controller, Apr. 26, 2000, <URL http:www.citadel.edu/ece/eedesign/cktsdotcom/index.html>.

"3-Phase AC Motor Control with V/HzSpeed Closed Loop Using the DSP56F80X," Motorola Order No. AN1910/D, Rev. 1.0, Apr. 2001.

"Understanding and Using DC-AC Inverters," Electrus Distribution Reference Data Sheet: Inverter.PDF(1), 2001.

Fehr, R., "Harmonics Made Simple," Jan. 1, 2004 [online], [retrieved Apr. 5, 2005] <URL:http://www.ecmweb.com/powerquality/electric_harmonics_made simple].

Pulse Width Modulated Inverter, Nov. 1998, [online], [retrieved Mar. 23, 2004],<URL:http://www.ece.misstate.edu/-hagler/Nov1998/08/PWMINV.HTM>.

The Institute of Electrical and Electronics Engineers, Inc., IEEE Std. 519-1992, Jun. 15, 2004, "IEEE Recommended Practices and Requirements for Harmonic Control in Electrical Power Systems".

Rajashekara K., Bhat, A. K.S., Bose, B. K., "Power Electronics", The Electrical Engineering Handbook, Ed., Richard C. Dorft, Boca Raton: CRC Press LLC, 2000.

Erickson, R., "Some Topologies of High Quality Rectifiers", First International Conference on Energy, Power, and Motion Control, May 5-6, 1997, Tel Aviv, Israel.

Erickson, R., "DC-DC Power Converters", Encyclopedia of Electrical and Electronics Engineering, Ed., John G. Webster Wiley.

Bausch, H. And Hofmann, H., "A Starter/Alternator System With Permanent Magnet Machine And AC Power Supply Based On A Space Vector Controlled Three- and Single Phase Converter For Mobile Applications," Universitat der Bundeswehr Munchen.

Chapman, S., "Pulse-Width Modulation Inverters," in "Electric Machinery Fundamentals," (McGraw Hill 2000, 3rd Ed) pp. 189-195.

U.S. Department of Energy, Energy Efficiency and Renewable Energy, Oct. 2003 [online], [retreived Apr. 5, 2005] <URL: http://wvw.eere.energy.gov/consumerinfo/factsheets/bb8.html>.

Mihalache, L., Power Conversion Technologies, Inc., "DSP Control of 400 Hz Inverters for Aircraft Applications".

Tolbert, L. and Habetler, T., Oak Ridge National Laboratory, "Novel Multilevel Inverter Carrier-Based PWM Methods," IEEE IAS 1998 Annual Meeting, St. Louis, Missouri, Oct. 10-15, 1998, pp. 1424-1431.

"Sinusoidal PWM Operation of an AC Induction Motor Controller," AC Motor Controller, Apr. 26, 2000, pp. <URL http:www.citadel.edu/ece/eedesign/cktsdotcom/index.html>, Only 6 pages submitted and considered.

"3-Phase AC Motor Control with V/Hz Speed Closed Loop Using the DSP56F80X," Motorola Order No. AN1910/D, Rev. 1.0, Apr. 2001.

Electrus Distribution Reference Data Sheet: Inverter.PDF(1), "Understanding and Using DC-AC Inverters," 2001.

Fehr, R., "Harmonics Made Simple," Jan. 1, 2004 [online], [retreived Apr. 5, 2005] <URL: http://wwvv.ecmweb.com/powerquality/electric_harmonics_ made_simple>.

Pulse Width Modulated Inverter, Nov. 1998, [online], [retreived Mar. 23, 2004]<URL: http://www.ece.msstate.edu/~hagler/Nov1998/08/PWMINV.HTM>.

The Institute of Electrical and Electronics Engineers, Inc., IEEE Std 519-1992, Jun. 15, 2004, "IEEE Recommended Practices and Requirements for Harmonic Control in Electrical Power Systems".

Rajashekara, K., Bhat, A.K.S., Bose, B.K. "Power Electronics", The Electrical Engineering Handbook, Ed. Richard C. Dorf, Boca Raton: CRC Press LLC, 2000.

Erickson, R., "Some Topologies of High Quality Rectifiers", First International Conference on Energy, Power, and Motion Control, May 5-6, 1997, Tel Aviv, Israel.

Erickson, R., "DC-DC Power Converters", Encyclopedia of Electrical and Electronics Engineering, Ed. John G. Webster, Wiley.

* cited by examiner

SYSTEMS AND METHODS FOR REDUCING THE MAGNITUDE OF HARMONICS PRODUCED BY A POWER INVERTER

BACKGROUND

1. Field of the Invention

This disclosure relates to the field of electrical power conversion, specifically to power inverters and methods to reduce harmonics in a direct current (DC) to alternating current (AC) power inverter by providing a reference signal having an irregular period.

2. Background of the Invention

Power inverters are a commonly used device for providing alternating current (AC) power to devices which utilize AC power input when traditional AC power grids or other infrastructure are not available. In particular, a power inverter is designed to take in direct current (DC) power and convert it to a form which approximates traditional AC power.

The DC power source supplying an inverter may be provided in any format and from any source. In many common applications of power inverters, the DC power source is an alternative electrical power generator such as a fuel cell, solar panel, or wind turbine. In other applications, the DC power is obtained from an internal combustion or similar engine that mechanically drives a permanent magnet alternator. These systems are commonly used to provide for readily available AC power in emergencies or in locations lacking reliable power infrastructure. DC power may also be obtained from rectified AC power. DC to AC power converters are also commonly used on board vehicles where DC power may be readily available from the vehicle's engine compartment but AC power is generally not easily obtained.

AC power is often a more useful source of energy than DC power for a variety of reasons. The most common is often that AC power allows the use of standard off the shelf equipment designed to operate off a power grid providing AC power. DC powered versions of these appliances are often bulkier and less efficient, incurring higher energy losses. Further, certain types of appliances require AC power in operation as only an AC voltage provides the required operational characteristics. While the general concept of AC power is fairly common, AC power may be provided at a variety of different voltages and frequencies in different parts of the world, and with specialized applications such as for use on aircraft.

In remote areas where power infrastructure may not exist, or may have been disabled due to military action or disaster, it is generally necessary to provide generators to produce power to operate electrical devices. In many of these situations, AC power is necessary because devices to be operated were previously used with an AC power grid which is no longer operating. Further, as the military, and other groups, become increasingly reliant on electronic technology and other electrical devices to operate efficiently, the need for AC power generators has increased dramatically in order to allow them to carry out necessary tasks.

While the ability to produce AC power from DC power through the use of an inverter is a relatively simple basic technology, many modern AC powered devices are sensitive to the "cleanliness" of the power provided to them and to the electromagnetic interference (EMI) present in the environment in which they operate. Advanced electronics including, but not limited to, communication devices, computers, and sensing equipment may have their performance impaired by electrical noise and EMI if their AC power source is not of sufficiently high quality. This noise can be distracting to the operator and can reduce the operating effectiveness of the device. In many modern applications, this is unacceptable as it can cause problems in using devices essential for military, disaster recovery, medical, or other critical applications.

The problem of noise in a DC to AC power converter often arises because the power inverter, while producing an AC power output, does not actually produce a "true" AC voltage signal. A "true" AC power source such as a power utility grid generator transfers power in a form closely resembling a sine wave. Therefore, the AC voltage signal is considered an alternating signal with a predetermined frequency. DC power, however, generally is transferred at a constant voltage signal. Therefore, when starting with a DC power source, the power inverter will generally provide some form of square wave output signal instead of a sine wave.

In creating from a DC power source AC power that is similar to that obtained from a true sine wave, one technology which is particularly useful is pulse-width modulation (PWM) which is also called pulse-duration modulation (PDM). The PWM circuit provides a set of electronic switches, typically insulated gate bipolar transistors (IGBTs). A control logic, such as, but not limited to, processor or electronic system is used to turn the switches on and off in a well orchestrated manner to produce a sequence of pulses of a fixed positive and negative magnitude and a varying duration whose root-mean-square (RMS) value approximates that of a sine wave.

While this system is effective at producing relatively good AC power at a desired frequency, there is a significant presence of undesirable signals in the resultant AC voltage signal from this methodology due to the switching action generating other constructive interactions. The frequencies of these signals are generally integer multiples of the frequency of the switching signal. For instance, if the desired AC signal is at 400 Hz, as is commonly used in many aircraft applications, and the reference frequency is 10 kHz, then the switching frequency is 20 kHz and undesirable signals are usually seen at 20 kHz, 40 kHz, 60 kHz and other integer multiples. The first harmonic (20 kHz in this case) is often the most problematic due to its relatively large magnitude. The interference can range from a simple nuisance noise such as a hum or static on a communication channel, to actually causing overheating or other dangerous situations in the device and therefore control of harmonics is quite important.

Traditionally, harmonics have been dealt with by attempting to remove or attenuate them from the AC voltage signal prior to power use by an electrical device, instead of trying to eliminate their production. IEEE standard 519-1992 for example, the entire disclosure of which is herein incorporated by reference, provides for suggested practices for dealing with harmonics. The standard generally recommends filtering of power lines prior to power use to attenuate problematic harmonics, and to design switching angles to eliminate some harmonics. Further, internally wiring structures to handle harmonics is also recommended.

While these standards are a logical way to attempt to deal with harmonics, they all suffer from the fundamental flaw that they do not eliminate the generation of the harmonics, instead they simply try to attenuate them from the power line after generation. These processes, therefore, require the use of altered construction methods of AC powered devices and additional components to provide for filtering. It would be desirable to instead eliminate or minimize the generation of harmonics in the beginning as fewer downstream components and modifications would be needed.

SUMMARY

Because of these and other problems in the art, described herein are systems and methods to reduce the magnitude of harmonics produced by a power inverter by varying the switching frequency of the inverter. These systems and methods result in AC voltage signals which generally contain more attenuated harmonic signals. Devices that use the resultant AC power then require less filtration to eliminate or further attenuate the harmonics to eliminate or reduce the problematic noise and electromagnetic interference.

There is discussed herein, a direct current (DC) to alternating current (AC) pulse width modulation (PWM) power inverter including a set of switches and a control logic operating the set of switches based on a control signal and a reference signal, the improvement comprising: the control signal comprising a sine wave having a frequency equal to the desired output of the power inverter; and the reference signal comprising a triangular wave, the wave having irregular periodicity.

In an embodiment of the power inverter, the irregular periodicity comprises a sequence of periods; the sequence exhibiting a uniform probability distribution with mean at a target period ($T_{target}$). The sequence of periods from a set of periods may be separated by multiple of a fixed time value ($\Delta t$). The periods in the set of periods may lie in a time interval bounded between a maximum period and a minimum period In an embodiment of the power inverter the power inverter comprises a single-phase or three-phase power inverter.

In an embodiment of the power inverter the control signal and reference signal are generated by the control logic.

There is also discussed herein, a method for having a control logic perform pulse width modulation comprising: using a control signal having regular periodicity; and using a reference signal having irregular periodicity.

In an embodiment of the method, the control signal comprises a sinusoidal waveform and may be generated by the control logic.

In an embodiment of the method, the reference signal comprises a triangular waveform and may be generated by the control logic.

In an embodiment of the method the irregular periodicity comprises a sequence of periods; the sequence exhibiting a uniform probability distribution with mean at a target period ($T_{target}$). The periods in the sequence of periods from a set of periods may be separated by multiple of a fixed time value ($\Delta t$). The periods in the set of periods may lie in a time interval bounded between a maximum period and a minimum period.

In an embodiment of the method, the pulse width modulation is performed in a single-phase, three-phase, or other power inverter

BRIEF DESCRIPTION OF THE FIGURES

FIG. 1 provides an exemplary pulse width modulation (PWM) circuit. FIG. 1A shows a single-phase circuit while

DESCRIPTION OF PREFERRED EMBODIMENT(S)

Figure 1A:
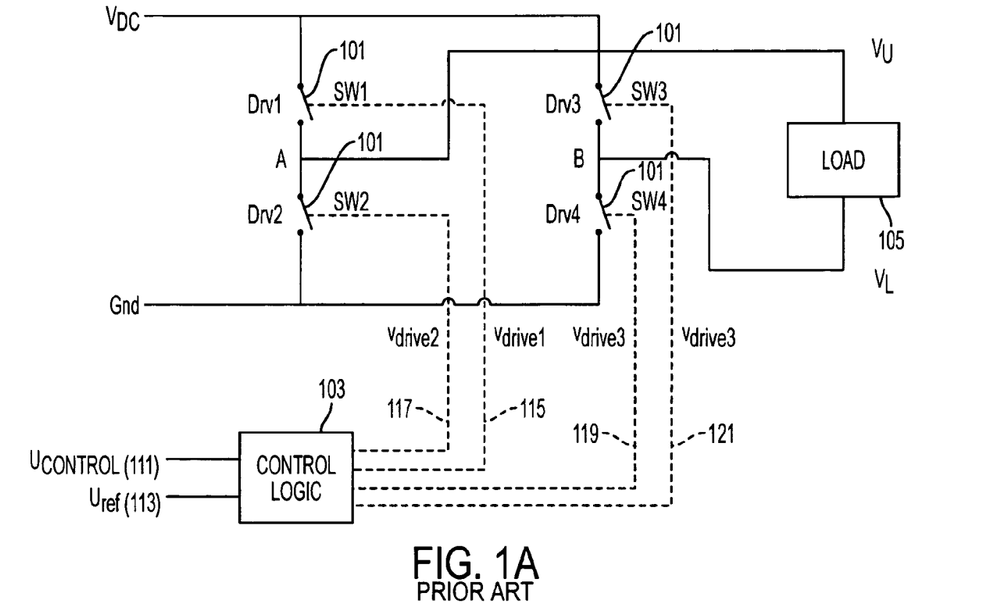
Figure 1B:
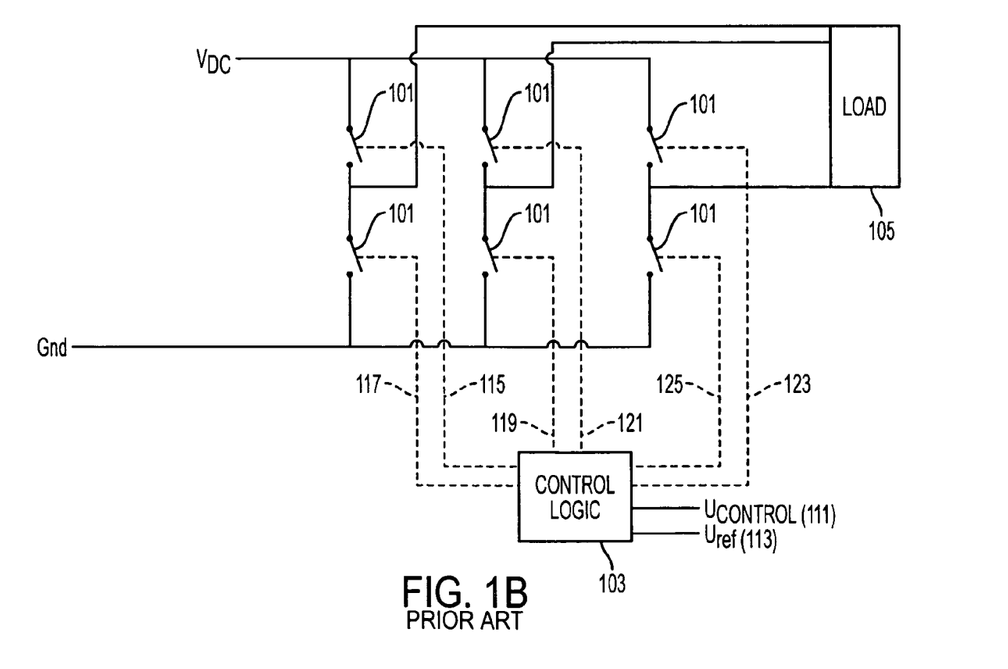
FIG. 1B shows a three-phase circuit.

In order to understand the operation of the present invention, it is best to begin with a general discussion on the operation of a PWM circuit. The discussion herein will focus on a single-phase PWM system for simplicity of discussion as shown in FIG. 1A. It would be well understood by one of ordinary skill in the art how to adapt this discussion for use in a three-phase system such as that shown in FIG. 1B. The PWM circuit may also be used in a four-phase system.

FIG. 1A provides for an example of a single-phase PWM circuit. The PWM comprises four switches (101) typically insulated gate bipolar transistors (IGBTs) which are arranged in an H-bridge configuration, a control logic (103) and a load (105). The control logic (103) operates the opening and closing of the switches (101) through the use of two input signals and four output signals. The two signals are the control signal ($u_{control}$) (111) which may also be called the modulating signal and the reference signal ($u_{ref}$) (113) which may also be called a carrier signal. The signals each comprise a waveform. In an alternative embodiment, the frequency or period of the signals is provided to the control logic (103) which internally produces the two signals. The control logic generates four output signals (115), (117), (119), and (121) to operate the switches (101). In the three-phase embodiment of FIG. 1B, output signals (115), (117), (119), (121), (123), and (125) are used.

Figure 2:
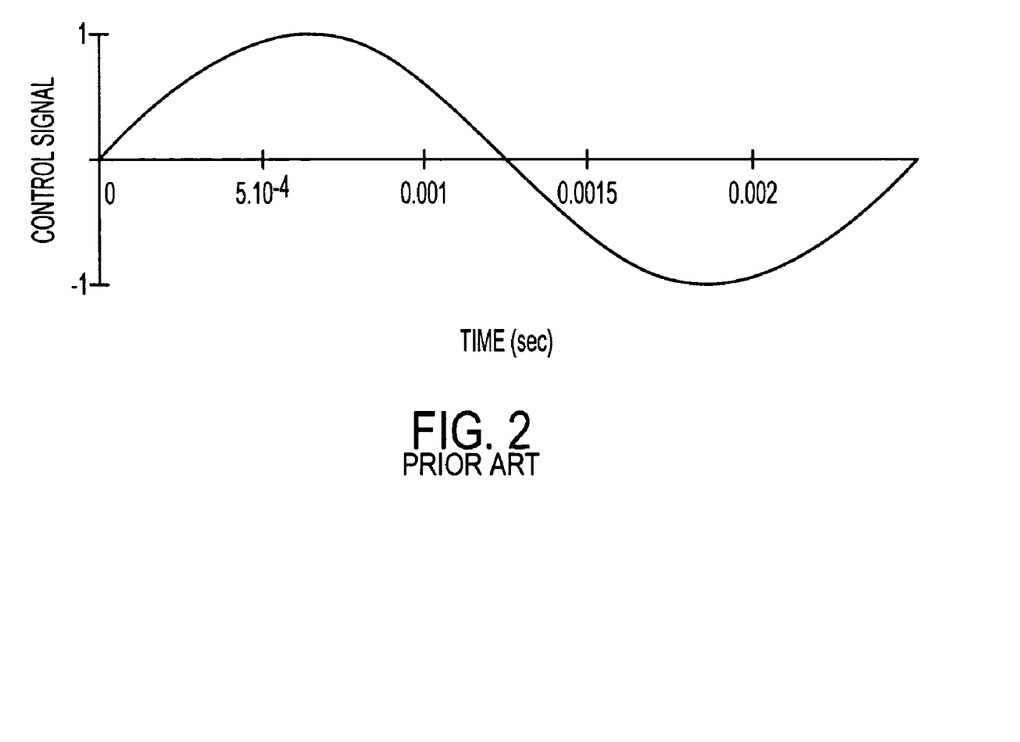
FIG. 2 provides an indication of a sample control signal used by a PWM inverter of the prior art to generate a 400 Hz AC voltage output FIG. 3 provides an indication of a triangular reference signal used by a PWM inverter of the prior art to generate a 400 Hz AC voltage output.
Figure 3:
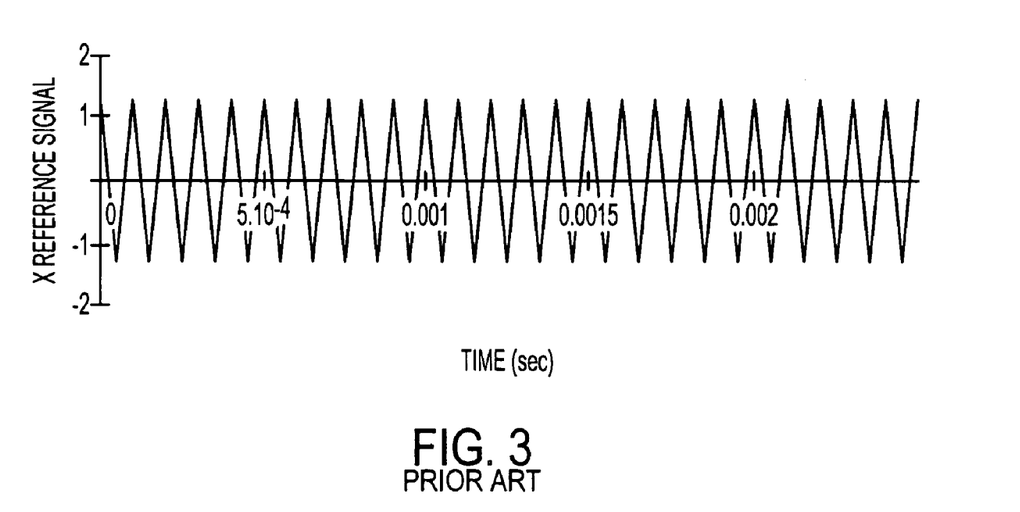

FIG. 2 shows an embodiment of a typical control signal of the prior art. The control signal ($u_{control}$) comprises a standard sine wave having period ($T_{control}$) selected to produce the frequency of the desired output voltage signal. In this case the output voltage is 400 Hz. FIG. 3 shows the embodiment of a typical reference signal of the prior art. The reference signal of FIG. 3 is a regular triangular wave having a fixed period of $T_{ref}$ (in this case 100 μsec corresponding to a frequency of 10 kHz). The period ($T_{ref}$) may be selected in any manner as understood by one of ordinary skill in the art. However, $T_{ref}$ is typically taken as simply an integer fraction of the period of the control signal and has previously been a fixed value throughout the reference waveform.

Figure 4:
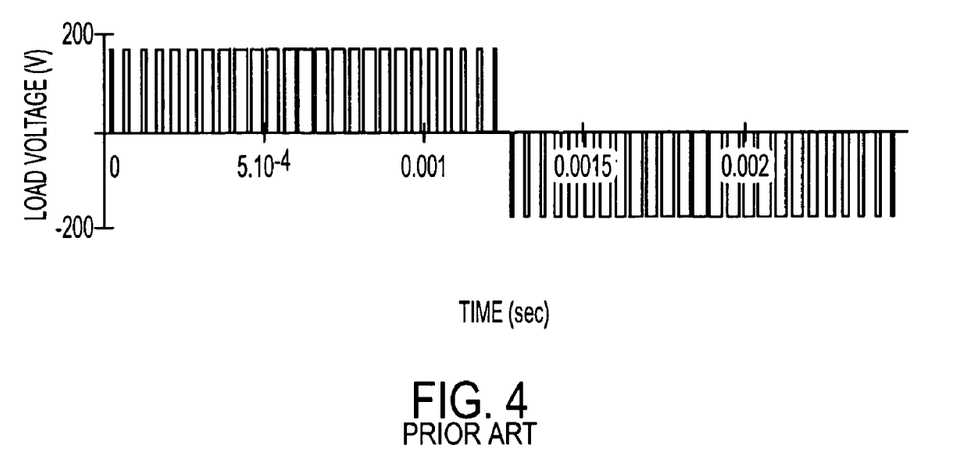
FIG. 4 provides an indication of the 400 Hz AC voltage signal produced by the PWM inverter using the signals of FIGS. 2 and 3.
Figure 5:
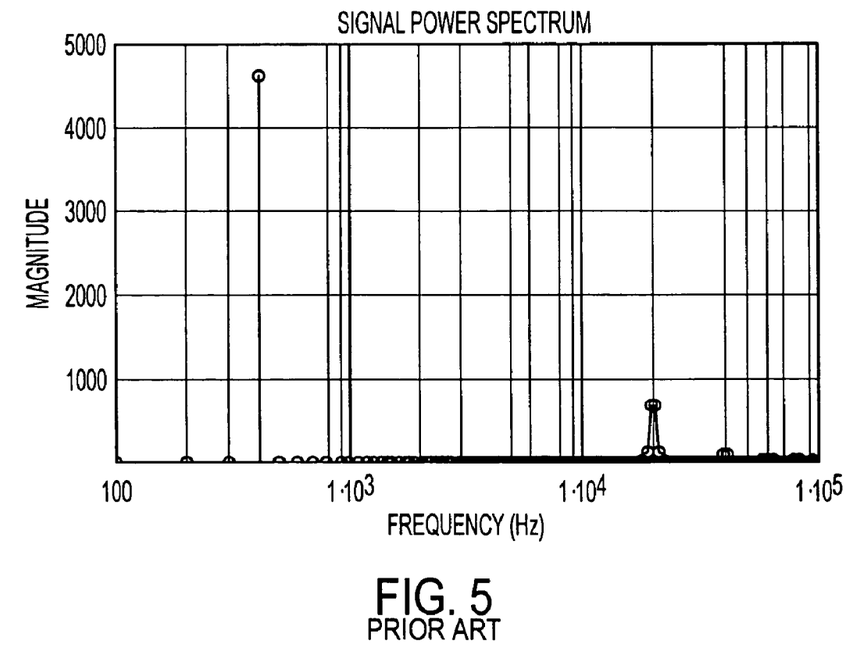
FIG. 5 shows the power spectrum, including harmonics, of the voltage of FIG. 4 when applied to an inverter load.

Operation of the switches (101) is controlled by the control circuit (103) in conjunction with the control signal ($u_{control}$) and the reference signal ($u_{ref}$). The resulting output wave (AC voltage signal) from the circuit of FIG. 1 utilizing the signals of FIGS. 2 and 3 is shown in FIG. 4. As should be apparent from FIG. 4, the output creates a pulse sequence modulated by the control signal. The final signal provides for a plurality of pulses of different widths and polarities, but constant amplitude which together have an RMS value approaching that of a sine wave. The circuit, therefore, generates a resultant output signal, the power of which approximates that of a sinusoidal signal. However, the generated voltage signal also includes harmonics due to other interactions in the resultant signal. While in some applications these harmonics are not of concern, they can present problems or be detrimental to the operation of certain types of equipment. The harmonic content of the signal of FIG. 4 is shown in FIG. 5 wherein the large spike at 400 Hz is the desired AC output frequency. The spikes to the right show the amplitude of the detrimental harmonics which are generated at the same time. The first harmonic (20 kHz) is particularly of large magnitude and particularly problematic.

Without altering the structure of the PWM inverter circuit of FIG. 1 or providing for filters or other devices electrically downstream from the inverter to eliminate or reduce harmonics, the harmonics produced by the power inverter can be significantly reduced by varying the period ($T_{ref}$) of the reference signal. In particular, the period is made irregular, and, in an embodiment, this variation is performed by supplying a reference waveform having an irregular period, with the occurrence of the periods being defined by a uniform probability distributing with near at or near a target period $T_{target}$.

The reference signal may be created as follows. First, the target period ($T_{target}$) is identified. So as to make understanding of the operation easier, the target period ($T_{target}$) selected in this embodiment is $T_{ref}$, so $T_{target}=T_{ref}$. Next the number of different periods ($n_{period}$) which will be used is selected. This number is used to create a reference set (S) of available periods $\{T_{ref1}, T_{ref2}, \ldots, T_{refn}\}$. To establish the periods in the set (S), it can simplify the process to have the periods be selected so that each of the periods are separated by a multiple of $\Delta t$ seconds. The value of $n_{period}$ therefore represents the number of periods in the reference set (S) that are used by the control logic (103). A higher value of $n_{period}$ will generally result in a higher number of harmonics (as the number of harmonics generated is based on the periods in the set), but each harmonic will generally have a lower magnitude as the noise power is distributed between them, therefore generally attenuating the noise by spreading it over a larger number of frequencies.

The value of $\Delta t$ establishes the total "spread" of the reference set (S) about the target period providing a finite bonded time internal. The lower bound of the set is defined as:

$$T_{lower} = T_{target} - \frac{n_{period} * \Delta t}{2}$$

while the upper bound is defined as $$T_{upper} = T_{lower} + n_{period} * \Delta t$$

Generally, a smaller value of $\Delta t$ will compact the set around the target period ($T_{target}$), while a larger value will spread out the set across a larger line segment. Therefore the smaller the value of the $\Delta t$ the closer to a fixed frequency ($\Delta t=0$) the reference signal becomes. Generally, the larger the value of $n_{period}$ the more attenuated the individual harmonics will become. Further, with appropriate selection of $\Delta t$ and $n_{period}$ a user can also make fine adjustments to the output signal.

Figure 6:
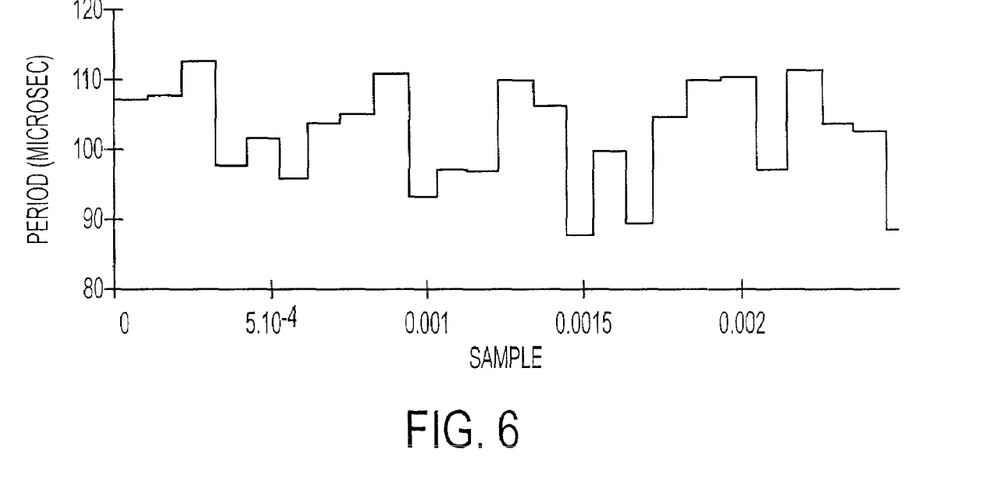
FIG. 6 provides a sample sequence of uniformly distributed reference signal periods.

An essentially infinite sequence constructed from the periods in the set (S) by the control logic during operation of the power inverter is used in place of the single value $T_{ref}$. The infinite sequence is preferably structured so that the occurrence of the periods in the sequence exhibits a uniform probability distribution with mean at or near $T_{target}$. FIG. 6 shows an embodiment of a sample period sequence which is uniformly distributed about a period ($T_{target}$) of 100 μsec. As should be apparent to one of ordinary skill in the art, this FIG. shows merely one of a virtually limitless number of period sequences which can occur.

Figure 7:
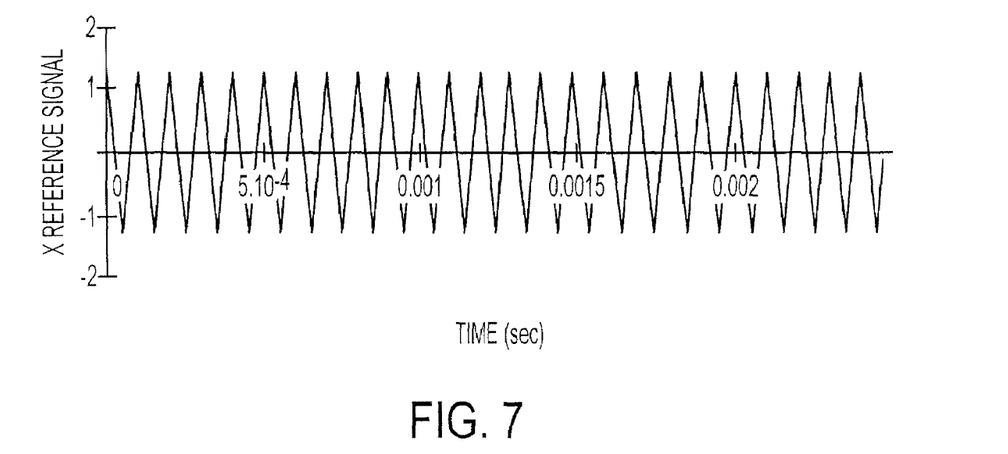
FIG. 7 provides for a reference signal generated from the sample sequence of FIG. 6.
Figure 8:
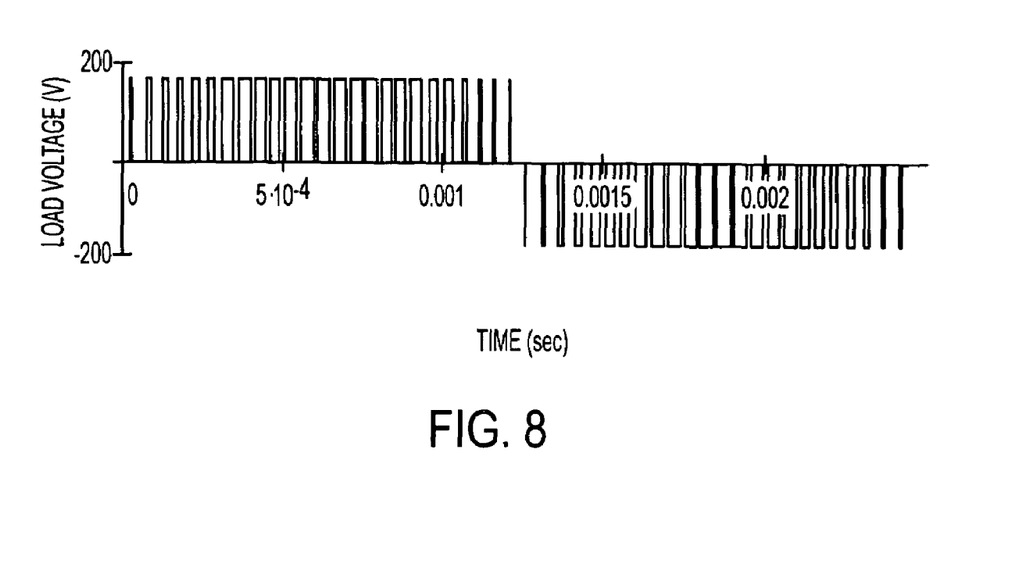
FIG. 8 provides for an AC voltage signal generated from the reference signal of FIG. 7 in conjunction with the control signal of FIG. 2.
Figure 9:
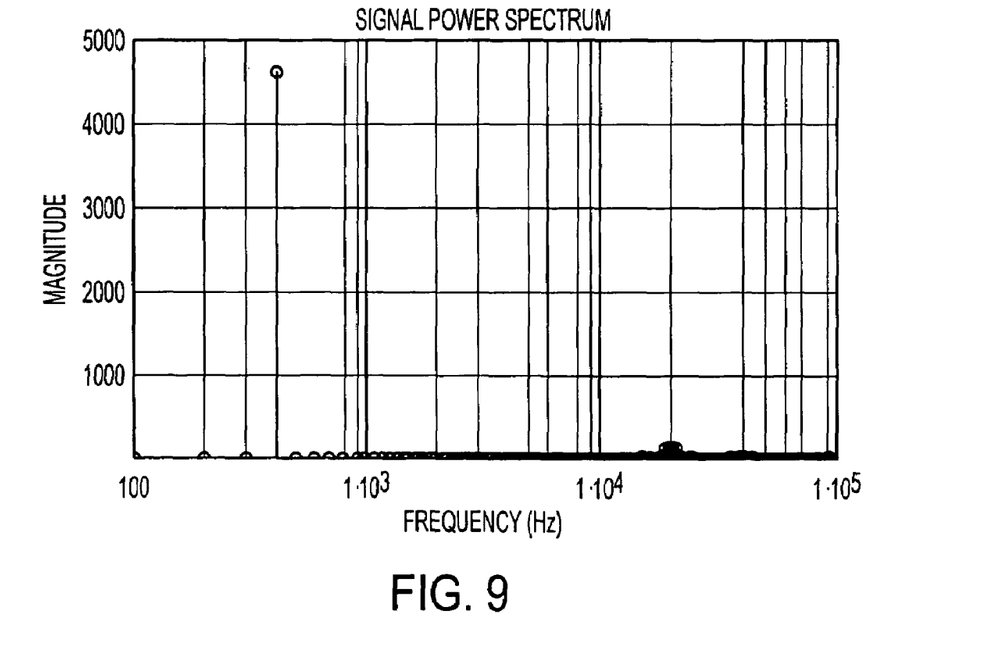
FIG. 9 shows the power spectrum, including harmonics, of the voltage of FIG. 8 when applied to an inverter load.

In the embodiment of FIG. 6, $T_{target}$ is selected to be equal to $T_{ref}$ from the first example to correspond to the signal of FIG. 3 and to generate a similar resultant AC power value. $\Delta t$ is selected to be 0.10 μsec simply for convenience. The selected value of $n_{period}$ is equal to 256. The number of periods ($n_{period}$) will generally be selected as a power of two ($2^X$) for simplicity, but that is by no means required. The uniformly distributed reference periods provide that the resultant reference signal generated therefrom, as shown in FIG. 7, is not regularly periodic with each cycle as it was in FIG. 3. Instead, a slight irregularity has been introduced due to the use of the set (S) of periods. This is more apparent in the resultant signal produced using FIG. 7 as the reference signal and FIG. 1 as the control signal. This signal is shown in FIG. 8.

An essentially infinite sequence constructed from the periods in the set (S) by the control logic during operation of the power inverter is used in place of the single value $T_{ref}$. The infinite sequence is preferably structured so that the occurrence of the periods in the sequence exhibits a uniform probability distribution with mean at or near $T_{target}$. FIG. 6 shows an embodiment of a sample period sequence which has a number of juxtaposed different periods uniformly distributed about a period ($T_{target}$) of 100 μsec. As should be apparent to one of ordinary skill in the art, this FIG. shows merely one of a virtually limitless number of period sequences which can occur.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. A direct current (DC) to alternating current (AC) pulse width modulation (PWM) power inverter including a set of switches and a control logic operating said set of switches based on a control signal and a reference signal, the improvement comprising:

said control signal comprising a sine wave having a frequency equal to the desired output of said power inverter; and said reference signal comprising a triangular wave, said wave having irregular periodicity, wherein, said irregular periodicity comprises a sequence of a predetermined number (n) of juxtaposed different periods, said sequence exhibiting a uniform probability distribution with mean at a target period ($T_{target}$), said n different periods differ from one another by a multiple of a fixed time value ($\Delta t$), and an upper bound period ($T_{upper}$) and a lower bound period ($T_{lower}$) of the n different periods satisfy the following respective equations:

$$T_{lower}=T_{target}-(n \times \Delta t)/2$$

and $$T_{upper}=T_{lower}+(n \times \Delta t).$$

2. The power inverter of claim 1 wherein said power inverter comprises a single-phase power inverter.

3. The power inverter of claim 1 wherein said power inverter comprises a three-phase power inverter.

4. The power inverter of claim 1 wherein said control signal is generated by said control logic.

5. The power inverter of claim 1 wherein said reference signal is generated by said control logic.

6. A method for having a control logic perform pulse width modulation comprising:

using a control signal having regular periodicity; and using a reference signal having irregular periodicity, operating said pulse width modulation in a power inverter based upon said control signal and said reference signal, wherein, said irregular periodicity comprises a sequence of a predetermined number (n) of juxtaposed different periods, said sequence exhibiting a uniform probability distribution with mean at a target period ($T_{target}$), said n different periods differ from one another by a multiple of a fixed time value ($\Delta t$), and an upper bound period ($T_{upper}$) and a lower bound period ($T_{lower}$) of the n different periods satisfy the following respective equations:

$$T_{lower} = T_{target} - (n \times \Delta t)/2$$

and $$T_{upper} = T_{lower} + (n \times \Delta t).$$

7. The method of claim 6 wherein said control signal comprises a sinusoidal waveform.

8. The method of claim 6 wherein said control signal is generated by said control logic.

9. The method of claim 6 wherein said reference signal comprises a triangular waveform.

10. The method of claim 6 wherein said reference signal is generated by said control logic.

11. The method of claim 6 wherein said power inverter comprises a single-phase power inverter.

12. The method of claim 6 wherein said power inverter comprises a three-phase power inverter.

* * * * *

UNITED STATES PATENT AND TRADEMARK OFFICE
CERTIFICATE OF CORRECTION

PATENT NO.         : 7,688,605 B2
APPLICATION NO.    : 11/190743
DATED              : March 30, 2010
INVENTOR(S)        : Asdrubal Garcia-Ortiz, John Wootton and Michael Duello It is certified that error appears in the above-identified patent and that said Letters Patent is hereby corrected as shown below:

On the face page of the patent:

(75) Inventors: "Asbrubal Garcia-Ortiz, Chesterfield, MO (US)"

should be (75) Inventors: --Asdrubal Garcia-Ortiz, Chesterfield, MO (US)--

Signed and Sealed this
Fourteenth Day of June, 2011

David J. Kappos
*Director of the United States Patent and Trademark Office*